Patented Sept. 7, 1943

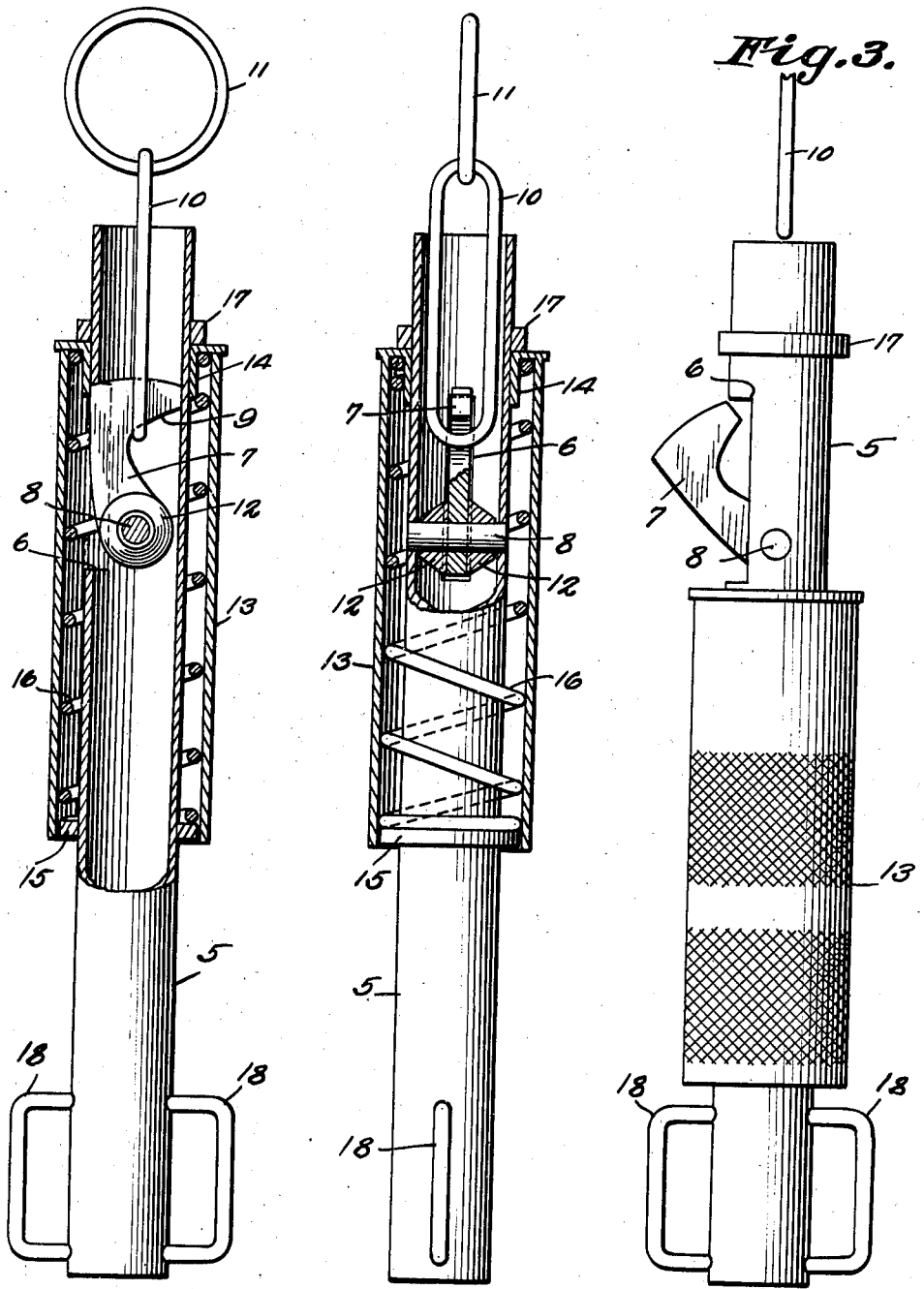

2,328,914

UNITED STATES PATENT OFFICE 2,328,914

PARACHUTE RELEASE HOOK

Joseph E. Kubat, Cromwell, Minn.

Application March 26, 1943, Serial No. 480,685

5 Claims. (Cl. 294—83)

This invention relates to parachute release hooks, an object of the invention being to provide a hook for connecting parachutes to harness positioned on a person, or an object being dropped from an airplane, the primary object of the invention being to provide a hook of this character which may be readily and easily operated to release the parachute to avoid injury to the person using the parachute caused by the person and parachute landing in the water, or due to the delay in spilling the air from the parachute.

An important object of the invention is to provide a device of this character including a pivoted hook member adapted to engage in a ring or link carried by the parachute shroud, means being provided for readily and easily operating the hook to release the parachute at the will of the user.

Another important object of the invention is to provide a hook which is so constructed that the weight of the person or article supported by the parachute, will act to operate the hook to release the person or article, the hook being so constructed that while in its active or hooked position, the strain of the weight of the person or article supported by the parachute, will be distributed throughout the length of the body of the device, thereby relieving the pivot pin of the hook of undue strain.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view partly in section, illustrating a parachute release hook, constructed in accordance with the invention.

Figure 2 is a sectional view taken at right angles to Figure 1.

Figure 3 is a side elevational view of the parachute release hook, illustrating the hook as in its open or released position.

Referring to the drawing in detail the device comprises a tubular body portion indicated by the reference character 5, the body portion having a cutout portion 6 in the wall thereof, the opening 6 being of a size to receive the hook 7, which is pivotally mounted on the pin 8 that extends across the tubular body portion at a point near the open upper end thereof.

As clearly shown by Figure 1 of the drawing, the under edge of the head 9 is inclined presenting a cam surface to cause the elongated link 10 which is connected to the shroud ring 11, to move over the hook to release the parachute connected with the shroud ring 11.

Spacers indicated at 12 are positioned on the pivot pin 8 and are disposed between the outer surfaces of the hook 7 and inner surface of the tubular body portion 5. It might be further stated, that the free end of the hook 7 is of a length to extend across the tubular body portion 5, the narrow pointed end of the hook engaging the inner surface of the body portion 5, while the rear edge of the hook contacts with the upper wall of the cutout portion 6, as shown by Figure 1. Thus it will be seen that due to this construction, the pivot pin 8 is relieved of undue strain caused by the weight of the article or person supported by the release hook, the strain being directed throughout the length of the body portion 5.

The reference character 13 designates the hand grip of the device, and comprises a tubular member of slightly greater diameter than the body portion 5, so that it will move freely over the body portion. The upper edge of the hand grip extends inwardly and downwardly as at 14, the downwardly extended portion moving over the outer surface of the body portion 5 to guide the hand grip in its movements longitudinally of the body portion.

Welded to the body portion at a point substantially intermediate the ends thereof, is a ring 15 which provides a stop for the lower end of the coiled spring 16, the upper end of the coiled spring resting within the space formed between the inwardly and downwardly extended portion 14, and inner surface of the hand grip 13.

The ring member 17 is welded to the body portion 5 at a point adjacent to the upper end of the body portion, and provides a stop within which the upper end of the hand grip 13 engages, restricting upward movement of the hand grip. It will also be noted that the downwardly extended portion 14 of the hand grip is of a length so that when the hook 7 has been moved to its active connecting position, the downwardly extended portion 14 will rest against the rear edge of the hook, holding the hook against movement under normal conditions.

Secured to the lower end of the body portion 5 are loops 18 with which the harness of the person using the parachute, or bundles connected therewith, are connected.

In the use of the device, assuming that the person to whom a parachute is connected, by means of the hook, wishes to disconnect the parachute from his harness, the operator merely grips the hand grip 13 and moves the same longitudinally of the body portion, against the action of the spring 16. As the hand grip moves downwardly past the hook, the weight of the person will tend to slide the elongated link 10 over the cam surface 9 of the hook, moving the hook to its released position, as shown by Figure 3. It is obvious that the shroud of the parachute will be released avoiding injury which may occur due to the parachute failing to spill the wind, to the end that the person would be carried along with the parachute, in the wind.

It will also be noted that, due to this construction, an aviator or person may readily release the parachute should a landing in a body of water be necessary, thus avoiding accident by the parachute pulling the person under the water.

Having thus described the invention, what is claimed is:

1. A parachute release hook, comprising a tubular body portion having an opening in the wall thereof, a hook pivotally mounted within the body portion and adapted to move through said opening, said hook adapted to engage a link connected with a parachute shroud ring, positioned in one end of the body portion, a tubular hand grip adapted to move over the body portion closing said opening, said hand grip adapted to engage the hook normally holding the hook against outward movement, yieldable means adapted to move the hand grip over the body portion in one direction, and loops on the body portion whereby the body portion may be secured to a harness.

2. A parachute release hook, comprising a tubular body portion having an opening in the wall thereof, a hook pivotally mounted within the body portion and adapted to move through the opening, releasing a link extending into the body portion and connected with the hook, the free end of the hook being of a length to extend across the body portion, said hook adapted to engage one end wall of the opening in the body portion, a tubular hand grip mounted for sliding movement on the body portion, said tubular hand grip adapted to close the opening, a portion of the hand grip resting against the hook preventing outward movement of the hook, and yieldable means for normally urging the hand grip to its active position.

3. A parachute release hook, comprising a tubular body portion having an opening in the wall thereof, the opening being disposed near one end of the body portion, a pivoted hook member mounted within the body portion at the opening, and adapted to swing outwardly through said opening, the free end of said hook being of a length to extend across the body with one edge of the hook flush with the outer surface of the body, said hook having a cam surface for engagement with a shroud link extended into the body portion, and a tubular member movable over the body portion and adapted to engage said hook, holding the hook against outward movement to release said shroud link.

4. A parachute release hook, comprising a tubular body portion having an opening in the wall thereof, a hook pivotally mounted within the body portion and adapted to swing outwardly and through the opening, releasing a shroud link with which it is connected, a sleeve movable over the body portion and adapted to close said opening, one end of the sleeve extending inwardly and rearwardly and adapted to engage said hook when the hook has been moved to a position within the body portion, holding the hook against outward movement, and loops on the body portion by means of which the body portion is secured to a harness.

5. A parachute release hook, comprising a tubular body portion having an opening in the wall thereof, a hook pivotally mounted within the body portion and adapted to swing to its released position, through said opening, said hook adapted to engage a shroud ring extended into the body portion, securing the shroud ring to the body portion, a sleeve movable longitudinally of the body portion and adapted to close said opening, said sleeve adapted to engage the hook holding the hook within the body portion under normal conditions, and said hook adapted to automatically release the shroud ring, when the sleeve is moved along the body portion to uncover the opening.

JOSEPH E. KUBAT.